United States Patent [19]

Norbert. Massie A. et al.

[11] Patent Number: 5,108,168

[45] Date of Patent: Apr. 28, 1992

[54] HIGH RESOLUTION TELESCOPE INCLUDING AN ARRAY OF ELEMENTAL TELESCOPES ALIGNED ALONG A COMMON AXIS AND SUPPORTED ON A SPACE FRAME WITH A PIVOT AT ITS GEOMETRIC CENTER

[75] Inventors: Norbert. Massie A., San Ramon; Yale, Oster, Danville, both of Calif.

[73] Assignee: The United States of America as represented by the United States Department of Energy, Washington, D.C.

[21] Appl. No.: 524,118

[22] Filed: May 16, 1990

[51] Int. Cl.$^5$ .................... G02B 23/04; G02B 23/06; G02B 23/16; G02B 7/20

[52] U.S. Cl. .................... 359/419; 359/429; 359/350; 359/577; 359/618

[58] Field of Search ............... 350/163, 557, 568, 567; 356/141; 250/203.6; 364/822

[56] References Cited

U.S. PATENT DOCUMENTS

| | | |
|---|---|---|
| 2,457,543 | 12/1948 | Goldsmith et al. |
| 3,502,387 | 3/1970 | Hadley . |
| 3,507,547 | 4/1970 | Thomas . |
| 3,992,629 | 11/1976 | Chapman . |
| 4,424,802 | 1/1984 | Winders . |
| 4,667,090 | 5/1987 | Carreras et al. .............. 356/141 |
| 4,671,130 | 6/1987 | Byers .............................. 350/568 |
| 4,776,684 | 10/1988 | Schmidt-Kaler . |

FOREIGN PATENT DOCUMENTS 717692  9/1977  U.S.S.R. .

OTHER PUBLICATIONS

E. Keith Hege et al., "Multiple mirror", *Applied Optics* vol. 24, No. 16, Aug. 15, 1985, pp. 2565-2576.
A. B. Meinel, "Aperture Synthesis", *Applied Optics*, vol. 9, No. 11, Nov. 1970, pp. 2501-2504.
Golay, "Point Arrays Having Compact, Nonredundant Autocorrelations", Letter in *J. Opt Soc. Am., vol. 61, No. 2, Feb. 1971, pp. 272-273*.
Miller, "Noise Considerations in Stellar Speckle Interferometry", *J. Opt. Soc. Am.*, vol. 67, No. 9, Sep. 1977, pp. 1176-1184.
Weaver et al., "Design Considerations for Multiple Telescope Imaging Arrays", *Optical Engineering*, vol. 27, No. 9, Sep. 1988, pp. 730-735.
Harvey et al., "Performance Characteristics of Phased Array and Thinned Aperture Telescopes", *Optical Engineering*, vol. 27, No. 9, Sep. 1988, pp. 762-768.
Roddier, "Interferometric Imaging in Optical Astronomy", *Physics Reports*, vol. 170, No. 2, Nov. 1988, pp. 98-166.
Massie et al., "Low-Cost, High-Resolution Telescopes for Imaging Low-Earth Orbit Satellites", SPIE Conf. Paper, Tuscon, Ariz., Feb. 1990.
Davis et al., "High-Resolution Imaging", Institutional Research and Development, Lawrence Livermore Laboratory, May 25, 1989.

*Primary Examiner*—Jon W. Henry
*Attorney, Agent, or Firm*—L. E. Carnahan; Roger S. Gaither; William R. Moser

[57] ABSTRACT

A large effective-aperture, low-cost optical telescope with diffraction-limited resolution enables ground-based observation of near-earth space objects. The telescope has a non-redundant, thinned-aperture array in a center-mount, single-structure space frame. It employes speckle interferometric imaging to achieve diffraction-limited resolution. The signal-to-noise ratio problem is mitigated by moving the wavelength of operation to the near-IR, and the image is sensed by a Silicon CCD. The steerable, single-structure array presents a constant pupil. The center-mount, radar-like mount enables low-earth orbit space objects to be tracked as well as increases stiffness of the space frame. In the preferred embodiment, the array has elemental telescopes with subaperture of 2.1 m in a circle-of-nine configuration. The telescope array has an effective aperture of 12 m which provides a diffraction-limited resolution of 0.02 arc seconds. Pathlength matching of the telescope array is maintained by a electro-optical system employing laser metrology. Speckle imaging relaxes pathlength matching tolerance by one order of magnitude as compared to phased arrays. Many features of the telescope contribute to substantial reduction in costs. These include eliminating the conventional protective dome and reducing on-site construction activities. The cost of the telescope scales with the first power of the aperture rather than its third power as in conventional telescopes.

4 Claims, 8 Drawing Sheets

TABLE I

| SOURCE | PATH PARAMETER/ PATH ERROR | ERROR BUDGET (MICRONS) |
|---|---|---|
| PATH CHANGES IN OPTICAL AXIS | $z$<br>$\sigma_z < 0.1\mu$ | $0.1\mu$ |
| TILT OF ELEMENTAL TELESCOPE | $f(M\phi)^2/2$<br>$\phi < 2$ ARC SEC | 0.02 |
| DIFFERENTIAL MOTION BETWEEN ELEMENTAL TELESCOPE'S PRIMARY AND SECONDARY MIRRORS | $2z$<br>$\sigma_z < 0.1\mu$ | 0.2 |
| MOTION OF ELEMENTAL TELESCOPE'S TURNING FLAT IN x AND y AXIS | $\approx 3\sigma_z$<br>$\sigma_z < 0.1\mu$ | 0.3 |
| PUPIL MOTION | $\theta\delta$<br>$\delta < 1mm, \theta < 30$ as | 0.15 |
| TOTAL ROOT-SUM-SQUARE | | $0.40\mu$ |

FIG. 10

HIGH RESOLUTION TELESCOPE INCLUDING AN ARRAY OF ELEMENTAL TELESCOPES ALIGNED ALONG A COMMON AXIS AND SUPPORTED ON A SPACE FRAME WITH A PIVOT AT ITS GEOMETRIC CENTER

BACKGROUND OF THE INVENTION

This invention was made in the course of or under prime Contract No. W-7405-ENG-48 between the United States Department of Energy and the University of California.

This invention relates generally to a high resolution optical telescope for observing space objects, and particularly to a single-structure, diffraction-limited telescope array employing speckle interferometric techniques.

It is desirable to have ground-based identification and assessment of objects in space, particularly satellites.

An adequate resolution would be to distinguish two points 10 cm apart on an object at a maximum distance of 1000 km. This requires an optical telescope having an angular resolution of 0.02 arc seconds (10 radian).

Astronomical studies also benefit from the use of high resolution telescopes. For example, at telescope diameters of about 10 m, features on the surfaces of supergiant stars can be resolved; at 100 m, active galactic nuclei can be resolved.

Generally, the resolution increases with the first power of a telescope's aperture, and the light collecting capacity increases with the second power of its aperture. Theoretically, the resolution of a telescope is ultimately limited by diffraction of its aperture. In the diffraction limit, the minimum distance between two resolvable object points is given by $\sim \lambda/D$, where $\lambda$ is the observation wavelength and D is the aperture of the telescope. Thus the larger the aperture, the higher the resolution the telescope has. For a telescope with a diffraction limit of 0.02 arc seconds, the effective aperture of the telescope must be of the order of 10 m.

However, as the size of the telescope aperture increases, so do the problems of maintaining optical tolerance and mechanical stability. Traditionally, the cost of an optical telescope scales as the third power of its aperture. To manufacture a monolithic optical element having an aperture of 10 m without distortions would be extremely expensive. Furthermore, the support structure will also be enormous and costly. For example, a telescope with an even larger aperture of 100 m would have a length approximately twice as long (200 m) as the aperture. The sheer size of it would present engineering problems in all aspects of the design, such as the yoke to hold the weight of the telescope and the engine underground to rotate the yoke. Also, to maintain the proper operational conditions and to minimize the temperature and stress distortions of such a large aperture would be expensive and would test the limits of present engineering techniques. In any case, such a telescope would have difficulties tracking satellites, which travel quickly in comparison to astronomical bodies.

Another serious problem is created by atmospheric turbulence. In practice, the theoretical diffraction limit of ground-based telescopes using conventional imaging techniques is severely compromised by the distortions of the atmosphere. This effect is caused by the same phenomena that cause stars to twinkle and is the result of minute temperature fluctuations in the atmosphere. Angular resolutions are nominally limited to one arc second which equates to 5 m resolution at 1 Mm range. As a consequence, a 5 m telescope has an effective resolving power of a 10 cm telescope, despite its enormous light-collecting capability.

There exists several techniques for minimizing atmospheric perturbations and achieving diffraction-limited resolution. A general solution is to locate the telescope as high above the earth's atmosphere as possible. Thus, high resolution telescopes are generally located on mountaintop. This helps to reduce the atmospheric effects somewhat but also comes with the penalty of higher construction cost and limited choice of sites. Another way is to circumvent the problem by deploying a telescope in space, above the earth's atmosphere, such as the soon to be launched, very expensive, Hubble space telescope.

For ground-based systems, adaptive optics have been used to correct atmospheric perturbations. The perturbed wavefront is sensed and corrected in real time by adaptive adjustments to individual elemental surfaces of the optics by means of actuators. This is a complicated and expensive technique since an actuator density of $10^3 \, m^{-2}$ may be required for adequate adaptive correction.

One technical approach of obtaining diffraction-limited images is called speckle interferometry. It is derived from a family of so-called "non-standard" imaging techniques and is the optical analog of successful techniques used by radio astronomers. Astronomers have pioneered such techniques in imaging simple celestial objects, albeit with extremely long integration periods. Various interferometric imaging techniques have been reviewed in F. Roddier, "Interferometric imaging in optical astronomy," published in Physics Reports, vol.170, no.2, Nov. 1988, pp.92-166.

To understand the problem posed by signal processing in the speckle-imaging process, consider observation by a large telescope of a point source, such as a star. Random distortions of the atmosphere, when averaged over seconds, create a circular blur of light at the focal plane. A perfect telescope of diameter D imaging an object through a vacuum would product a spot of angular width $\lambda/D$, whereas looking through the atmosphere produces a spot of angular width of $\lambda/r_0$, where $r_0$ is the coherence length of the distortion, typically 10 cm. By using a narrowband filter to increase the coherence length of light, and by taking short exposures to freeze the distortions, the image is found actually to compose of a random array of tiny spots, called speckles, of size $\lambda/D$. Information up to the diffraction limit of a telescope is present in the image even though it is scrambled. The problem then becomes one of how to unscramble that information.

The problem of recovering a diffraction-limited image from a sequence of speckle images is to reconstruct the spatial-frequency components of the image. This amounts to the estimation of both their magnitudes and their phases.

Magnitude estimation is the same as power spectral estimation. Such estimations are accomplished by collecting a set of speckle images from the object of interest and a second set of speckle images from a point star. An estimate of the power spectrum for each set of data is calculated by averaging the power spectrum from each frame. The estimate for the point-star data represents the transfer function of the telescope-atmosphere system. If the power spectrum estimate from the object speckle sequence is divided by the power spectrum estimate from the point star, the effects of the telescope-atmosphere system are corrected out to the diffraction limit of the telescope, resulting in an estimate of the object's power spectrum. This technique for estimating the power spectrum (or Fourier magnitude) of an object from two sets of speckle images is called Labeyrie's technique. However, except for certain special cases, an image cannot be obtained without also knowledge of the Fourier phase.

Two techniques for recovering the Fourier phase of the object from speckle measurements have been implemented. One technique, known as Feinup's spectral iteration, uses the magnitude estimate from the Labeyrie algorithm together with finite support and positivity constraints of the spatial-domain object image to estimate the phase. This technique is computationally slow, stagnates, and can lead to artifacts in the image. The second technique, known as bispectral estimation, is similar to the power spectral estimation of Labeyrie's algorithm, but does not require a reference point star for phase estimation. An estimate of the object's bispectrum (Fourier transform of the object's triple correlation) is obtained by averaging the bispectra of each speckle frame. The Fourier phase estimate is then obtained by an appropriate integration of phases in the bispectral estimate. This estimate, together with the Labeyrie estimate, produces a reconstructed image.

Thus, ground-based observation of space objects such as satellites requires an improved telescope and techniques which must provide the following attributes. First, it must have sufficiently high resolution. This requires a telescope with an effective aperture of at least 10 m extending to as large as 100 m. Secondly, the telescope must be able to track the satellites which move fast because they are relatively near the earth's surface. Thirdly, to realize the diffraction limit of the large aperture, atmospheric perturbations must be corrected. The observation must be performed within the available integration period, which is comparatively short, typically about 10 seconds. Existing telescopes do not provide all these attributes or are extremely expensive and impractical when scaled to do so.

Accordingly, one important object of the invention is to provide a low cost telescope with substantial increase in resolution.

Another important object of the invention is to provide a low cost telescope capable of tracking relatively fast moving objects such as satellites.

SUMMARY OF THE INVENTION

These and additional objects of the invention are accomplished, briefly, by a thinned-aperture array optical telescope optimized for speckle interferometric imaging.

According to one aspect of the invention, the telescope comprises an array of smaller telescope elements mounted on a steerable space frame. Beams from the telescope elements are combined to form an image in accordance with speckle interfometric techniques. The thinned-aperture array is preferably a non-redundant array so that maximum resolution is achieved with a minimum number of elements.

The use of a thinned-aperture array helps to reduce the size of the optics as well as the overall dimension of the telescope. Thus, a large effective aperture, yet lightweight and very stiff structure can be built at considerably lower costs.

The application of speckle imaging also places a less stringent requirement on path length tolerance. A much lower cost system results from having to match the path lengths to the coherence length of light after narrowband filtering (about 1.5 microns) rather than to a fraction of a wavelength (about 0.05 micron).

The placement of the telescope arrays on a single-structure steerable platform, in contrast to a multiple-structure array fixed on ground, avoids the problem of pupil geometry varying with view angle and the need for complicated path-delay compensation.

According to another aspect of the invention, the platform has an altitude-altitude (radar-like) mount providing high tracking rate along the zenith direction. This is in contrast to the conventional azimuth-altitude mount, which is not optimized for tracking satellites in low-earth orbits due to its singularity at zenith. In one embodiment, the mount is a uni-pivot ball and socket. In another embodiment, the mount is a gimbal bearing. In both embodiments, the center mount at the space frame provides altitude-altitude tracking as well as increases stiffness of the space frame.

According to another aspect of the invention, the space frame is driven by force actuators comprising of cables attached to the rim of the space frame. In this way the space frame's positioning is unaffected by stretching cables.

According to another aspect of the invention, a double-wall tubular shield forms the outer casing of each telescope element. Inside the casing is a primary and a secondary optical mirror held in place by a mirror yoke to form an afocal telescope. The casing and the mirror yoke are independently attached onto the space frame so that perturbations in the casing are not readily transmitted to the mirrors. In one embodiment, air-conditioning of the double-wall casing helps to insulate the telescope element from solar driven thermal loads. In another embodiment, shutters on the openings of each casing protect the telescope elements from severe weather and from dust when not in use. The overall design eliminates the need for a very costly, conventional protective dome housing for the entire telescope.

According to another aspect of the invention, the image is detected with silicon charge-coupled devices in the near infra-red end of the visible spectrum, thereby enhancing the signal-to-noise ratio of the imaging system.

According to another aspect of the invention, a laser metrology system monitors the pathlength differences among the beams of the telescope elements. In response, a path-length control system dynamically corrects for the differences.

The various aspects of the invention co-operate to provide a high resolution telescope capable of tracking, among other things, low-earth orbit space objects. The telescope is substantially cheaper to build and maintain relative to conventional ground-based telescopes. The cost of the telescope scales with the first power of the telescope's aperture instead of the third power as in the conventional case.

This has only briefly summarized the major aspects of the present invention. Other objects, advantages and aspects of the present invention will become apparent from the following detailed description which should be taken in conjunction with the accompanying drawings.

DETAILED DESCRIPTION OF THE DRAWINGS

Figure 7:
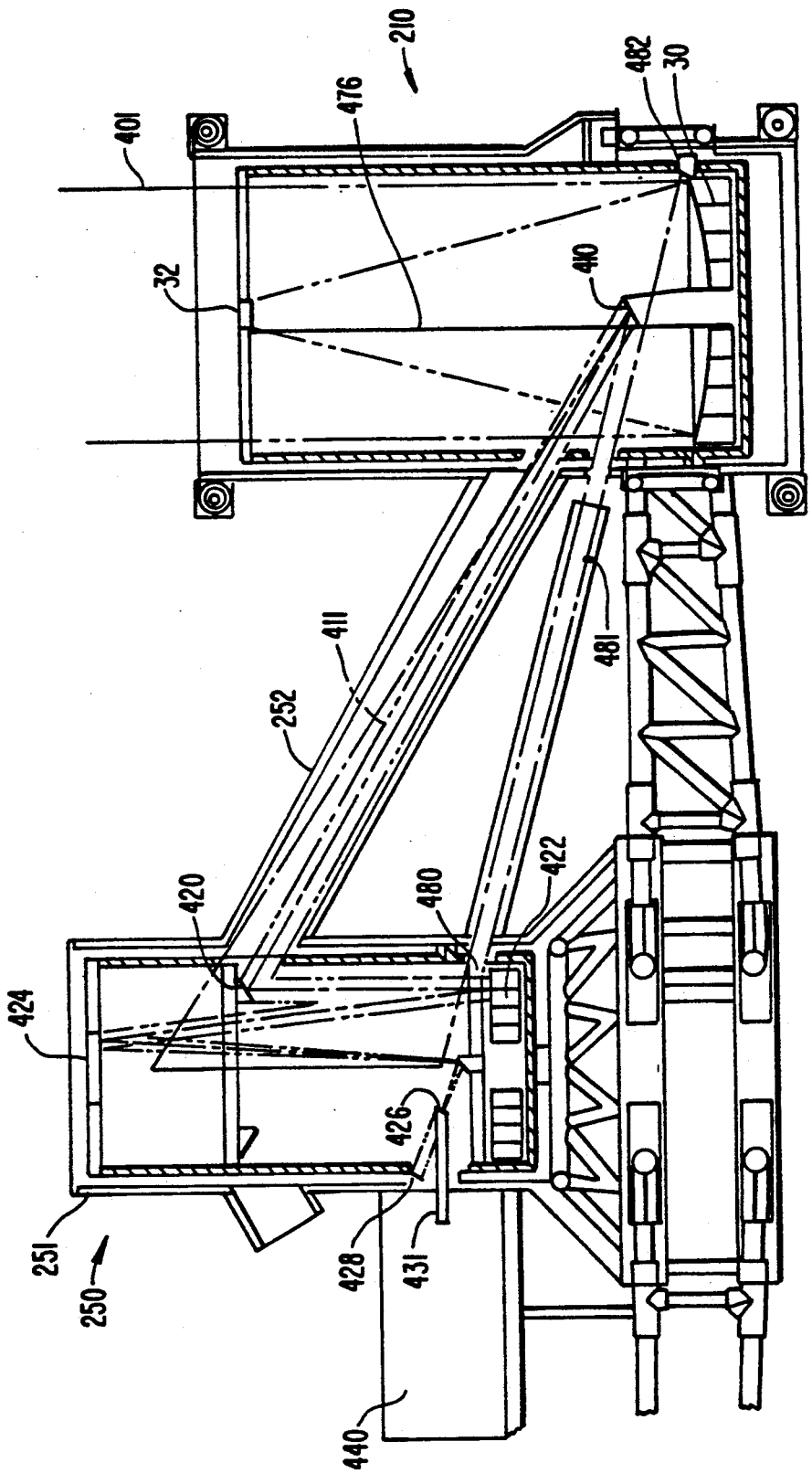
FIG. 7 illustrates in more detail the optical design of the preferred embodiment shown in FIGS. 4A and 4B.

FIG. 10 comprises Table 1 which summarizes the error sources and budget for pathlengths shown in FIG. 7.

DETAILED DESCRIPTION OF THE PREFERRED EMBODIMENT

As mentioned in an earlier section, it is desirable to image low-earth orbit space objects, such as satellites, with a resolution of 0.02 arc sec. Apart from the general desire for low cost, the other requirements are the ability to track relatively fast moving objects and that observation must be made over a limited period of about ten seconds.

The present invention accomplishes these goals by a single-structure, thinned aperture array on a steerable space frame. Speckle interferometric imaging is employed to achieve diffraction-limited resolution in spite of atmospheric turbulence. A preferred implementation is image-plane interferometry due to the short imaging times, the desire to measure image phase, and the desire to obtain maximum quality images by imaging in the photon rich regime. An added feature of speckle imaging is that the pathlengths of the interfering beams need only be matched to within the tolerance of the coherent length of light.

The invention overcomes three separate but related technical problems. The first is the signal-to-noise ratio which is particular acute given the short observation time and the use of a thinned-aperture design where there is less light collected. The second is the design for a large effective-aperture, low-cost telescope. The third is the pathlength matching of the beams from the array so that the beam from each subaperture will interfere.

Signal-to-noise enhancement

Analysis of the first problem has revealed that when using speckle interferometric imaging techniques, there is insufficient signal-to-noise ratio (SNR) for quality imaging in the mid-visible part of the spectrum. However, the signal-to-noise ratio would be substantially improved if observations are made at the red end of the spectrum. This leads to the use of a charge-coupled device (CCD) as an image sensor. This concept is contrary to the prevailing wisdom, which asserts that imaging should be performed in the mid-visible range with photon-counting sensors, primarily because the use of CCD sensors necessitates overcoming additive noise.

Details of the SNR analysis for speckle interferometric imaging have been set forth by N. A. Massie et al., "Low-Cost, High-Resolution Telescopes for Imaging Low-Earth Orbit Satellites," SPIE conference paper presented in Tucson, Ariz., February 1990. The entire disclosure of the Massie et al. paper is incorporated herein by reference. For example, at an aperture diameter of 12 meters and an observation wavelength of 1 micron and with $r_0$ at 0.5 microns of 10 cm, the SNR is 56. Thus, there will be sufficient SNR if imaging is performed in the red end of the spectrum and if telescopes are built and sites selected to optimize $r_0$. The only candidate photoemissive imaging sensor in the red would be GaAs, but its detective quantum efficiency is limited to about 10% and its longest wavelength of operation would be 0.8 microns. Further, photoncounting sensors suffer from limitations in count rates, and are not projected to be satisfactory for medium or large objects.

The use of Si CCD's in the present system is unconventional since they have additive noise. It is also recognized that existing Si CCD's had a low value for quantum efficiency in the near-IR. Nevertheless, improved Si CCD's are becoming available and they are viable photosensors for detecting images with the above-specified resolution and observation time.

Apart from the SNR enhancement, a further advantage of imaging in the near-IR is that it is likely that useful imaging could be conducted during daylight hours since the sky is darker in the IR. However, the disadvantage is that shifting the observations to the near-IR also requires shifting to a slightly larger aperture to obtain the same resolution. For a one micron imaging wavelength, a 12 m effective aperture telescope will be required.

Telescope Array System

Traditionally, optical telescopes have been built using single pieces of glass. However, as pointed out earlier, this would be very expensive to build and maintain since the cost goes up as the cube of the aperture. A low-cost alternative is to build a thinned aperture array where the extent of the aperture is increased without a continuous collecting surface. The main trade-off is the reduced light collecting capacity and the need to combine the beams carefully.

An alternative for a large telescope primary is a primary segmented telescope. It comprises a primary mirror made up of segments, all sharing a common secondary mirror. The segments must be carefully aligned to be in phase in order to achieve diffraction-limited performance. The alignment will be difficult to maintain in a large aperture implementation. Also the primary segmented telescope will most likely result in a conventional azimuth-altitude mount which is unsuitable for tracking low-earth orbit objects. In any case, primary segmented telescopes are still very expensive.

The thinned-aperture telescope is an array telescope. It comprises an array of elemental telescopes with their output beams combined to form an image at an image plane. Traditionally, radio astronomers have built thinned-aperture, array telescopes as multiple structure telescopes (MST). For the MST, the earth forms the inertial platform.

Figure 1:
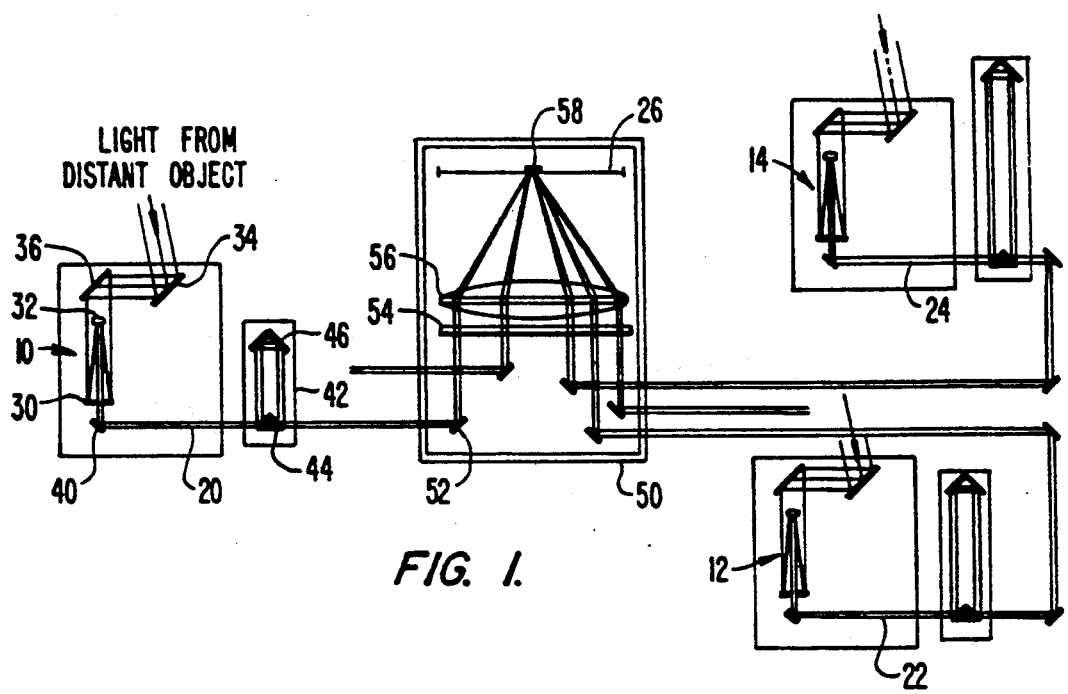
FIG. 1 illustrates schematically an optical realization of an array telescope.

FIG. 1 illustrates schematically an optical realization of a MST array telescope. It comprises an array of elemental telescopes such as 10, 12, 14 with their respective output beams 20, 22, 24 combined to form an image at an image plane 26. Typically, each telescope such as 10 comprises a primary mirror 30 and a secondary mirror 32. The telescope's optical axis is fixed and tracking of objects is provided by a pair of tracking mirrors, such as 34 and 36. A series of optical elements direct each output beam to the image plane. For example, the output beam 20 is directed by a first turning flat 40 through a dynamic delay-line module 42 into a beam-combining facility 50. The beam-combining facility 50 combines beams from all elemental telescopes to form an image at the image plane 26. Thus, after the output beam 20 emerges from the dynamic delay-line module 42, another turning flat 52 directs the beam through a narrow band filter 54 and a focusing lens 56 to a detector 58 at the image plane 26.

The beams from all the elemental telescopes must be properly aligned from input to output. The beam combining apparatus is typically underground with excavated passageways between the elemental telescopes. For MST structures, tracking must be co-ordinated among all the elemental telescopes.

Array telescopes require the pathlengths of the beams from the elemental telescopes to be carefully matched in order to realize the full diffraction-limited resolution. This is performed by the respective static delay-line and dynamic delay-line modules. In one embodiment, the static delay-line is just provided by a fixed pathlength, and the dynamic delay-line module 42 comprises a pair of mirrors 44, 46 in the path of the output beam 20. The distance between the pair of mirrors is dynamically adjustable in response to any pathlength difference detected relative to a reference.

Typically, in a "phased array" thinned aperture telescope, the pathlengths from each of the elemental telescopes are required to be matched to within a fraction of a wavelength, which is of the order of 0.05 micron. Complex and expensive pathlength control systems will be required to maintain such small tolerances.

A MST telescope has several disadvantages and is not suitable for tracking low-earth orbit objects. First, as the object passes overhead, the beam delay system such as the dynamic delay-line module 42 must compensate for the path variations. The beam delay lines must move nominally 100 times faster than when imaging objects moving at sidereal rates. While this is possible, it is a significant technical challenge of great expense. Secondly, as the object moves overhead, the pupil will change. Since imaging is likely to be accomplished during 10 degrees of motion, this is a significant problem. Also, one will seldom have a pupil which is uniform in both directions or that is optimally selected. Thirdly, the static and dynamic delay line lengths are substantial. Each static delay must be as long as that of the longest delay line of the outermost telescope. Thus, the total delay path length for the entire system is substantial as is the cost. Also a substantial amount of excavations would be required for passages of the beams between the elemental telescopes. Fourthly, the simplest possible telescope would not see the entire sky. At some expense, with a more complicated tracking mirror system, the telescope would see nearly all of the sky. In any case, there are doubts as to whether individually steered telescopes would be cost-effective or that pupil matching or tracking could be satisfied. Finally, each telescope must be equipped with a precision tracking mount, encoders, control systems, and so forth, all of which are expensive.

Single Structure Telescope (SST)

Figure 2A:
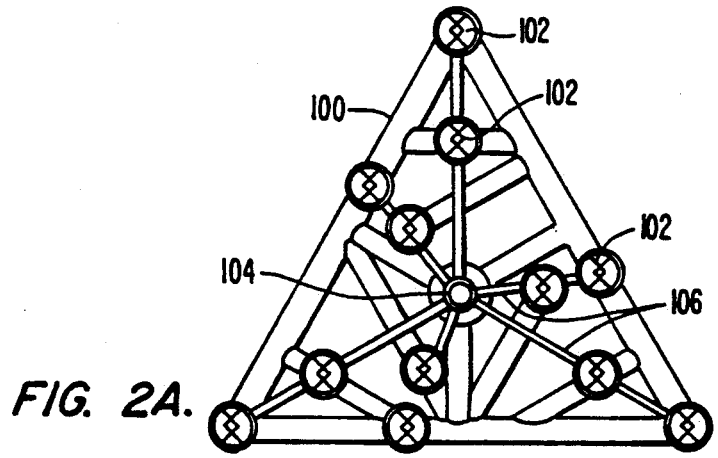
FIG. 2A is the plan view of a large-aperture, low-cost telescope system, according to one embodiment of the present invention.
Figure 2B:
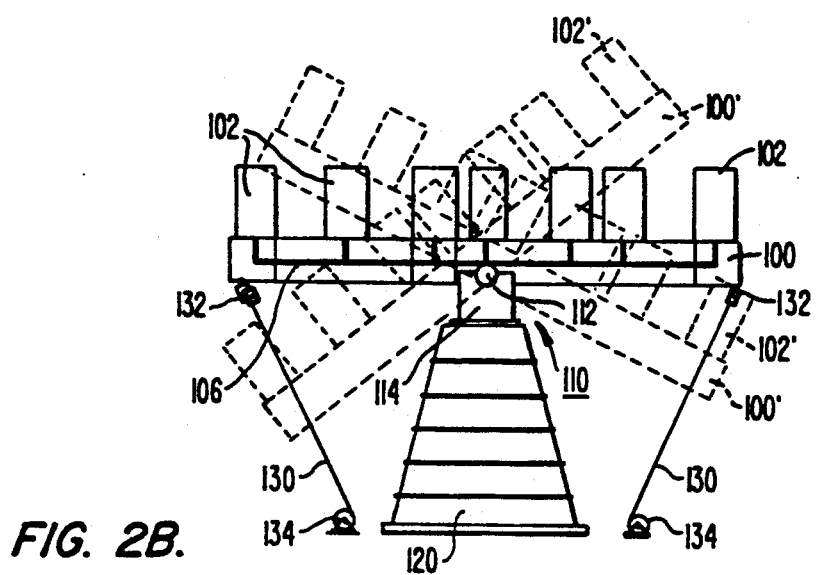
FIG. 2B is a cross-sectional view of the telescope system of FIG. 2A.

FIGS. 2A and 2B show one embodiment of an array telescope according to the present invention. A thinned aperture system is employed in which multiple elemental telescopes are arranged as a single-structure telescope (SST). In the SST, the array would be carried by a large, steerable space frame and would always present a constant pupil to the object. The pathlength control system would be much simpler since it only has to compensate for minor variation in path differences caused by thermal and gravity loads. However, the new issues that arise will be the technical challenge and cost consideration of a large-scale, single-structure that can provide a steerable yet stable platform for the telescope array.

A non-redundant array of subaperture telescopes is preferably used for the SST. Various non-redundant arrays have been discussed by M. J. E. Golay, "Point arrays having compact, nonredundant autocorrelations," Journal of Optical Society of America, vol.61, 1972, pp. 272–273, and by J. E. Harvey et al in "Performance characteristics of phased array and thinned aperture optical telescope," Optical Engineering, vol.27, no.9, Sept. 1988. Both the Golay paper and the Harvey paper are incorporated herein by reference. Aperture "thinning" is acceptable in the present instance whenever imaging is performed in the photon rich regime. For example, low-earth orbit satellites are relatively bright by astronomical standards. For non-redundant arrays, the number of telescope, which is the major cost driver, scales with the telescope diameter. Thus, to first order, the cost of the system will be some facility cost plus a constant times the diameter, and the classical $D^3$ scaling does not apply here.

FIG. 2A is a plan view of the SST mounted on a triangular space frame 100. A Golay 12 non-redundant array is employed. This telescope is composed of twelve 1.5 meter telescopes 102 spanning over the space frame 100 having 20 m outer diameter. The beams from each elemental telescopes are combined at a beam-combining module 104. FIG. 2B shows a front elevation view of the telescope of FIG. 2A. The elemental telescopes 102 are mounted on the space frame 100 which in turn is centrally mounted on a single pivot 110 on a pedestal 120. Beam transport from each elemental telescope 102 to the beam-combining module 104 is effected by a pipe 106 connecting therebetween.

In this embodiment the pivot 110 comprises a steel ball 112 resting on a socket provided by a yoke 114 on top of the pedestal 120. The ball pivot 112 provides a radar-like mount that allows the space frame 100 to be rotated about any azimuthal axis. For example in FIG.

2B, a tilted space frame is denoted by the numeral 100' supporting elemental telescopes 102'.

Steering of the space frame and therefore the telescope array is accomplished by cables 130. In one embodiment, each cable 130 is fixed at one end to an attachment 132 at the underside of a vertex of the triangular space frame 100. The other end of the cable is then wrapped around a drum traction 134 driven by a stepper motor on the ground. The motion of the telescope is controlled by using the cables as force actuators and therefore cable stretching will not be a major concern.

The telescope mount currently favored by astronomers is known as the azimuth-altitude mount, where the two axes of rotation are respectively in the vertical and horizontal direction. This mount has a large rotating turntable resting on the ground for the azimuth motion, with two posts mounted at the periphery of the turntable. Bearings for the altitude motion are at the top of the posts. The telescope is supported between these structures. Such a mount has two main disadvantages. The first is that the mount is at the side of the telescope so that the unsupported span is at least the diameter D of the telescope. The second disadvantage is that when objects pass directly overhead in this design, they cannot be tracked due to the requirement for infinite acceleration in the azimuth axis. Therefore, low-earth orbit objects such as satellites cannot be tracked due to the singularity in the vertical.

The mount 110 of the present invention avoids the above-mentioned disadvantages by employing an altitude-altitude mount similar to that of a radar mount. Its center-mount also increases stiffness of the telescope structure.

Figure 3A:
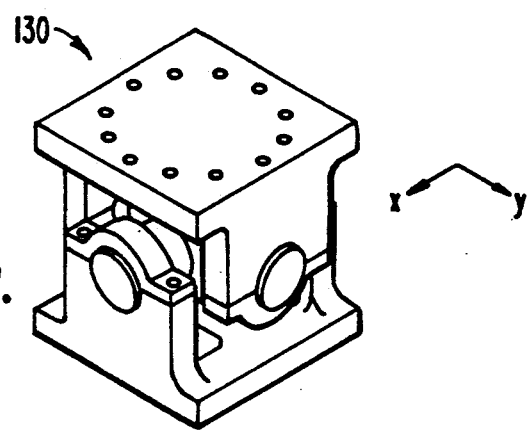
FIG. 3A shows a perspective view of a gimbal bearing as a preferred embodiment of the pivot of the telescope structure shown in FIG. 2A.
Figure 3B:
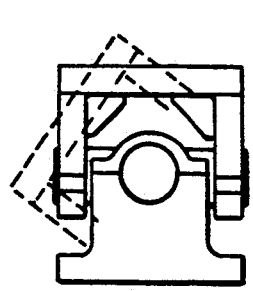
FIG. 3B shows a side elevation view along one axis of the gimbal bearing of FIG. 3A.
Figure 3C:
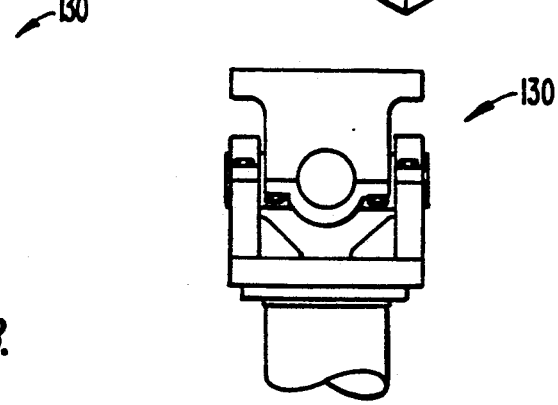
FIG. 3C shows a side elevation view along another axis of the gimbal bearing of FIG. 3A.

FIGS. 3A-3C illustrates several views of a gimbal bearing as an alternative preferred embodiment of the pivot 110 shown in FIG. 2B. FIG. 3A is a perspective view of a gimbal bearing 130 suitable as the pivot 110 of FIG. 2B. The two independent axes x, y of rotation lie in the horizontal plane, and therefore its singularity lies on the horizon. FIG. 3B illustrates a side view where the gimbal bearing 130 is rotatable along the x-axis. FIG. 3C illustrates another side view along the y-axis. The gimbal bearing, although more complicated than the ball and socket mount, has the advantage of being easier to fit with encoders. Also, torque motors can be mounted directly on it to steer the space frame.

For satellites, tracking rates to 1 deg/sec will be needed with mount tracking errors of below 10 arcsec desired. This can be achieved by the mounts and steering means of the present invention.

Figure 4A:
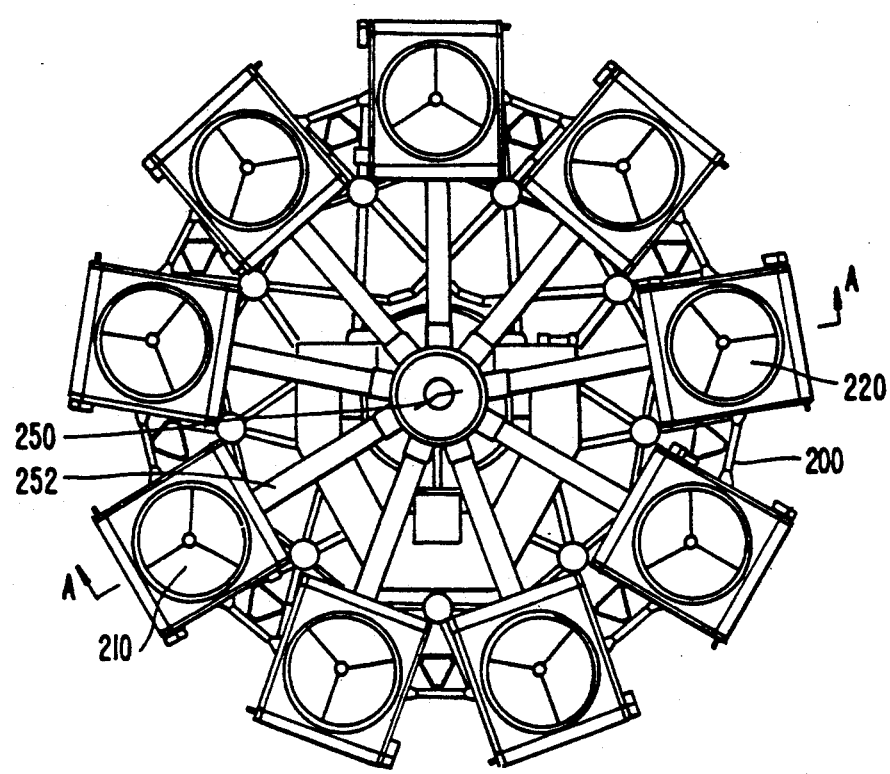
FIG. 4A is the plan view of a large-aperture, low-cost telescope system, according to a preferred embodiment of the present invention.

FIG. 4A is a plan view of a large-aperture, low-cost telescope system, according to a preferred embodiment of the present invention. A plurality of elemental telescopes such as 210, 220 are supported by a space frame 200 in a circle-of-nine arrangement. The beam from each elemental telescope, such as the telescope 210 is to be combined at the beam-combining module 250 and transported thereto via an enclosed pipe 252 which also serves as a structural member of the space frame.

Figure 4B:
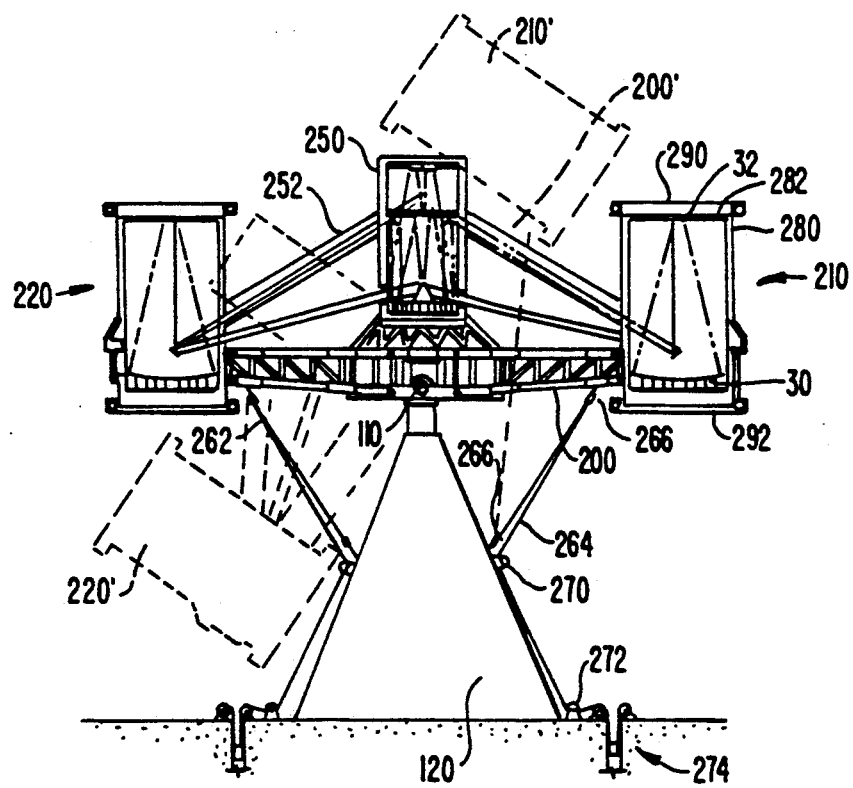
FIG. 4B is the view of the section A—A of FIG. 4A2.

FIG. 4B is a front elevation view showing the section A—A of FIG. 2A. The space frame 200 is supported centrally by a pivot 110 which is mounted on the pedestal 120 from the ground. The pivot 110 allows the space frame 100 to be rotated about any azimuthal axis. For example in FIG. 4B, a tilted space frame is denoted by the numeral 200' supporting elemental telescopes such as 210' and 220'. In the preferred embodiment, the pivot 110 is furnished by the gimbal bearing 130 previously described in conjunction with FIGS. 3A-3C.

Steering of the space frame 220 and hence the telescope array is accomplished by cables such as 262, 264. In one embodiment, the cable 264 is fixed at one end to an attachment 266 on the pedestal 120 and loops through a first pulley 268 at the underside rim of the space frame and then through a second pulley 270 on the pedestal adjacent the attachment 266. The cable is then wrapped around a drum traction 272 driven by a stepper motor on the ground. The other end of the cable terminates on the ground with a system of preload counter weights 274. The motion of the telescope is controlled by using the cables as force actuators and therefore cable stretching will not be a major concern.

Each elemental telescope such as 210 is protected by an outside casing 280. Inside the casing is a primary mirror 30 and a secondary mirror 32 held in optical alignment by a mirror yoke 282. The mirror yoke 282 may be tubular and together with the outside casing 280 form a double wall insulation so that the telescope can be used in the daytime. Forced air cooling would be used to reduce the impact of solar driven thermal loads. The outside casing 280 and the mirror yoke 282 are decoupled by being independently attached to the space frame 200. Thus, perturbations on the outside casing are transmitted to the space frame and not the mirror yoke holding the aligned optics. Each end of an elemental telescope 210 is equipped with a shutter such as 290, 292 for protection from sudden inclement weather and for dust protection when not in use. For periods of severe weather or maintenance, an inflatable enclosure (not shown) based on an existing technology may be used.

The spaceframe 200 is preferred although other support structures such as honeycomb panels are possible. Since this telescope was designed to operate without a dome, consideration was given to wind loading. Note that all beam paths are enclosed and actively controlled as discussed below. However, if the structure vibration is too severe, mount pointing errors will result. Since the spectrum of wind gusts is in general below 1 Hz, the structure was designed for a lowest structural resonance of at least 10 Hz. Static wind loading was not an issue for winds below velocities for which the turbulence would become excessive as well. In terms of cost, it is important to consider that they need to be referenced to work that must be accomplished at the site. On-site work is at least twice as expensive as work at a factory. As a result, the structure is designed to be built in sections and ported to the site for assembly. Various materials were considered for the telescope framework with the decision to use standard mild pipes for lowest cost.

Several important features of the invention contribute to the low cost of the telescope. First, the use of a non-redundant, thinned-aperture array of telescopes specifically designed for speckle imaging provides for substantial cost reduction. Also, since speckle imaging is employed to process the image scrambled by atmospheric turbulence, there is no need to match pathlength better than the random errors introduced by the atmosphere. This allows a relaxation of the pathlength matching tolerance to the coherence length of light, which is about one order of magnitude higher than that of phased-arrays. This results in a much less stringent, and therefore lower cost pathlength matching system.

Second, for conventional large telescopes, the dome, site and civil engineering represent a major fraction of the ultimate cost. Experiences have indicated that nominally 50% of the cost of building a telescope was associated with civil engineering, such as that of the dome and buildings.

The present telescope does not require a classical dome but is capable of operating unshielded in the wind. An inexpensive, inflatable cover may be provided as a cover during daytime and for protection during inclement weather. For tracking stability, the lowest resonant frequency of the SST should be ten times higher than wind gust frequencies (below 1 Hz). The telescope of the present invention is centrally supported on a ball or gimbal, and the longest 25 unsupported span is D/2. Since the lowest structural resonance scales as the inverse cube of the unsupported length, the center-mount structure has a resonance eight times higher than that of the classical side-mount one. Thus, the present structure is much less likely to be perturbed by wind. This allows greater freedom to operate in the wind without the need for a protective dome housing.

Third, the high-altitude sites classically used by astronomers contribute substantially to cost. Such sites are unnecessary for the present telescope; that is, it need not rise above atmospheric water vapor for 10 $\mu$m astronomy. Ground sites are available that have superb "seeing" (large $r_0$ values) and that involves low cost in terms of construction.

Figure 5A:
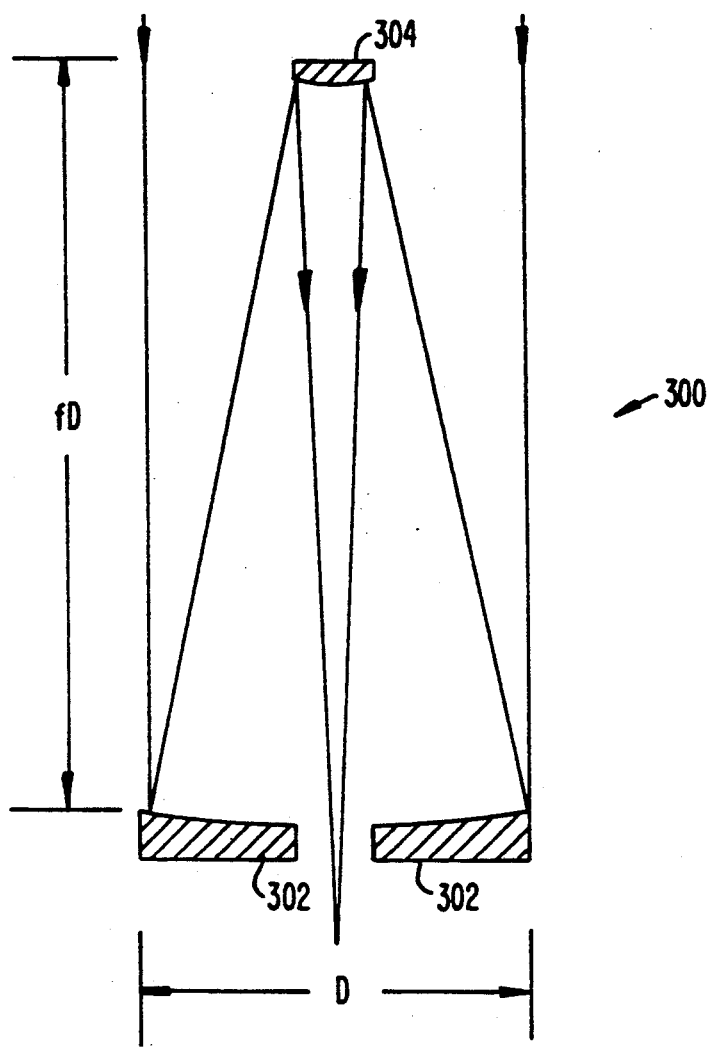
FIG. 5A illustrates the relative dimensions of a conventional monolithic telescope.
Figure 5B:
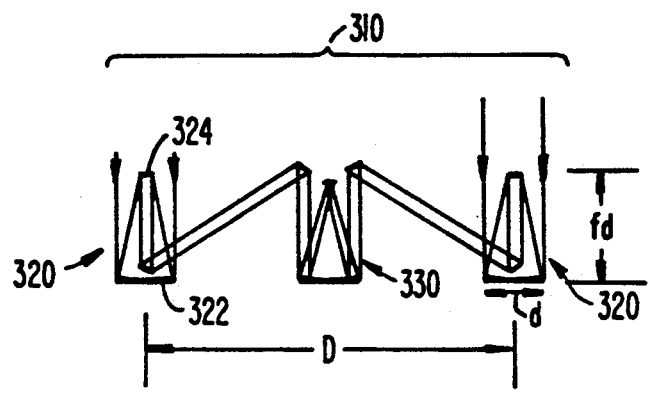
FIG. 5B illustrates the relative dimensions of a thinned-aperture telescope array.

Fourth, the thickness of the present telescope is much less than that of a conventional monolithic telescope of equivalent aperture. FIG. 5A illustrates the relative dimensions of a single telescope 300 having a primary mirror 302 and a secondary mirror 304. The aperture D of the telescope is the same as the diameter of the primary mirror 202. The thickness of the single telescope 300 is substantial since it is controlled by its f ratio times the diameter D. In contrast, FIG. 5B illustrates the relative dimensions of a thinned-aperture telescope array 310 having an effective aperture D. The telescope array 310 has a plurality of telescopes, two of which are shown; telescopes 320 spanning laterally to provide an effective aperture D. Each elemental telescopes 320 has a primary mirror 322 of smaller diameter d, and a secondary mirror 324. The beams from the elemental telescopes 320 combine at the beam-combining module 330 to form an image. The thickness of the array telescope 310 is now given by its f ratio times the diameter d of the smaller telescopes. As a result, the telescope array is almost two-dimensional rather than three dimensional. This leads to tremendous savings in the mechanical structure. The two-dimensional structure is well supported by a center-mount platform, thereby assuming resonances sufficiently high for operating without a dome.

Very large scale embodiments

Since the cost of the present telescope scales as the first power of the aperture, telescopes with very large effective-aperture (100 m and beyond) may be contemplated. These telescopes are useful for surveying GEOSAT's and for astronomical studies. Extending these concepts to 100 meters and beyond is an issue of construction versus operational considerations. For example, an array of over thirty telescopes would be required for a 100 m effective-aperture telescope—a very expensive proposition. However, images would be obtained very quickly. An alternative is to use only a few telescopes and measuring visibilities by pair wise combinations. However, that would take a very long time since hundreds of baselines are required. As a compromise the use of a linear array is considered. In one dimension, there are no non-redundant arrays above five telescopes. However, at the eight telescope level, it is possible to obtain an optimal placement.

Figure 6:
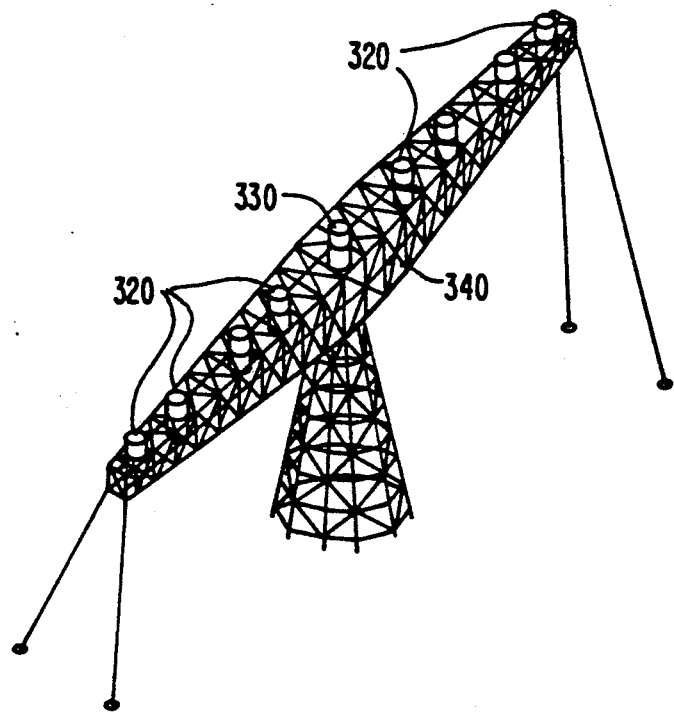
FIG. 6 illustrates a single-structure telescope having a very large effective aperture in one-dimension, according to one embodiment of the present invention.

FIG. 6 illustrates one embodiment of a SST having a very large effective-aperture of 100 m. A one-dimensional telescope design comprised of a center-mount, elongated space frame 340 with eight, 3 m elemental telescopes 320 mounted thereon. The beams from the eight telescopes 320 are combined in a beam combining module 330. The field of view is one-dimensional. Observation of all planes is accomplished by rotating the telescope.

Optical System

FIG. 7 illustrates in more detail the optical design of the preferred embodiment shown in FIG. 4B. The optical system must fulfill four major functions. The first function is to sample the 14.5 m diameter aperture of the array to provide adequate coverage of spatial frequencies in the image. This is provided by the nine elemental telescopes such as 210, each having a sufficiently large entrance pupil. The second function is to demagnify the exit pupil to a conveniently compact size. The third function is to reassemble the compact exit pupil into a configuration geometrically similar to that of the entrance pupils. The second and third functions are provided by the beam-combining module 250. The fourth function is to optically image it into an accessible space for subsequent image processing.

The first sampling function is accomplished by the nine elemental telescopes such as 210 with a sufficient large subaperture size of 2.1 m. The nine element, non-redundant, circular array illustrated in FIGS. 4A and 4B is preferred for the following reasons: First, it provides an open space in the middle for locating the beam combining system 250 and to allow for physical access around the beam combiner for installation and maintenance. Second, it has the major advantage that all path lengths are equal and all telescope assemblies are identical. This reduces the amount of design time and costs since each telescope is identical. Third, it produces a more compact modulation transfer function (MTF) (given by the autocorrelation of the pupil), as compared to other non-redundant configurations. For highest quality imaging, the ratio of the telescope spacing to telescope diameter is chosen so that the MTF will not have any internal zeros at its core. In selecting non-redundant arrays, the effective aperture of the array is conservatively defined as the distance to the first zero in the MTF. The distance to the first zero in the MTF was then set to 12 meters, giving an actual physical diameter of 14.5 meters with the individual telescope diameters being 2.1 meters.

The elemental telescope 210 is an afocal telescope which collects collimated light through a 2.1 m entrance pupil and outputs it with an exit pupil of diameter 0.2 m. In the preferred embodiment it is a Mersenne telescope (confocal paraboloids) and is diffraction limited over a +/−250 microradian field-of-view (FOV). It comprises the primary mirror 30 and the secondary mirror 32 held in optical alignment by the mirror yoke 282. The primary mirror 30 has an aperture of 2.1 m. The mirror yoke 282 is supported directly by the space frame 200. In this way, perturbation of the outer casing 280 is not readily transmitted to the mirror yoke. Light from a distant object enters the telescope 210 as an input beam 401, strikes the primary mirror 30 and the secondary mirror 32 in turn to become an output beam of diameter 0.2 m. This beam is deflected by a turning flat 410 into an output beam 411 which exits the telescope 210 via a passageway provided by a beam pipe 252 leading to the beam-combining module 250.

The second and third function are provided by the beam-combining module 250. The module 250 has an outside casing 251 similar to the elemental telescopes 210, which serves as a thermally controlled shroud. Inside, the module comprises a classical Cassegrain telescope (paraboloid/hyperboloid) followed by a recollimating paraboloid and is diffraction-limited over a +/−300 microradian FOV. Each output beam 411 entering the beam-combining module 250 is redirected via a turning flat 420 to a primary mirror 422 followed by a secondary mirror 424 of the Cassegrain telescope. The output pupil plane 426 is exactly one focal length of the final recollimating paraboloid past the final paraboloid. In this way, the nine output beams from the elemental telescopes are reassembled as a compact beam bundle. The beam bundle is a scaled-down circle-of-nine configuration similar to that of the elemental telescope array, and are readily accessible.

The pupil scale-down and relay requirements stem from desires to provide for optional addition of adaptive optics and to produce beam sizes convenient for common dielectric filters. It appears that a modest adaptive optical system would substantially improve the performance of the telescope. To accommodate the optional adaptive optical system, a pupil of the appropriate size is made available to an adaptive mirror 428 at an accessible location. At the pupil plane 426, the assembly of compact pupils has been scaled down to a diameter of 0.3 m, with each compact pupil being 4 cm. Common deformable mirrors have actuator spacings of several mm, so as many as 100 actuators could be used to cover each compact pupil. That is quite sufficient for implementing a limited-performance adaptive optics for substantially improving the performance of speckle imaging.

The fourth function is performed by the conventional optics in the optics box 440. The final beam bundle 431 provided in the optics box 440 has a beam width of about 4 cm. The nine elemental beams in the bundle are then combined interferometrically to form an image using conventional optics. Prior to the combining, the beam's coherence length is enhanced by band-pass filtering. The image is then detected by a sensor for further speckle image processing.

Electo-Optical Path Length Control System

The optical system shown in FIG. 7 must perform its tasks while keeping the pathlength differences within the prescribed tolerances in order to achieve diffraction-limited imaging performance. An important advantage of the present invention is that the use of speckle-imaging allows at least one order-of-magnitude relaxation in path-length matching requirement. The path lengths need be matched only to within the coherence length of filtered light, not to a fraction of a wavelength, as in conventional imaging. Thus, for a 12 meter telescope imaging at 1 micron wavelength, the path matching requirement is on the order of 1.5 microns, as compared to about 0.05 microns for phased arrays.

There are two major sources of pathlength variation as seem from a macroscopic viewpoint. The most obvious is that the individual paths shown in FIG. 7 simply are not constructed to be equal and will not remain constant under gravity or thermal loads. Less obvious, is that if the pupil geometry (a circle-of-nine in the present embodiment) at the entrance and exit pupils are not exact replicas, then even if the pathlengths are equal at some field angle, they will not be so at another field angle. This error is given by $\theta\delta$, where $\theta$ is the field angle and $\delta$ is the pupil location error with both quantities being measured in the same plane.

Referring to FIG. 7, there are three notable sources of play in the mechanical structure of the SST that result in path-length errors. The first is the spacing between the primary mirror 30 and the secondary mirror 32. The pathlength error is given by twice the spacing change. The second is the tilting of the elemental, afocal telescope 210 as a rigid body relative to the beam-combining module 250. This produces an error of $f(M\phi)^2/2$ where f is the telescope focal length, M is the telescope magnification, and $\phi$ is the angular tilt. In practice the error produced in a rigid structure is relatively minor, but the error is easily monitored and corrected. The third, and the most significant, is the position of the turning flat 410 in each elemental telescope 210 relative to the beam-combining module 250. Other movements such as translation of the elemental telescope 210 as a rigid body relative to the turning flat 410 do not produce pathlength error. A summary of the error sources and budget is given in Table 1. The error budget analysis indicates that if displacements are controlled to within 0.1 micron, the compounded error amounts to about 0.4 micron, well within the 1.5 microns matching requirement.

Figure 8:
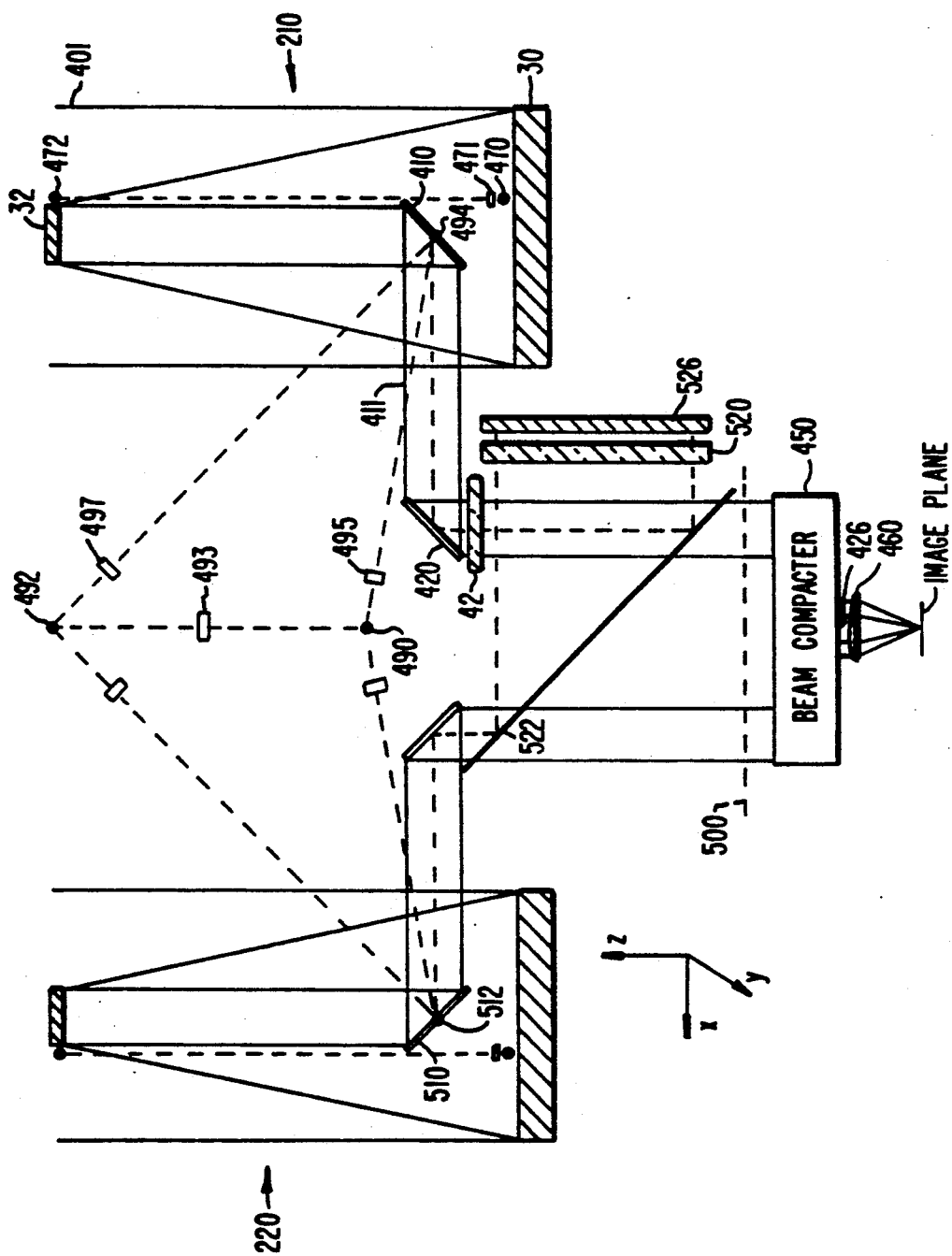
FIG. 8 is a schematic diagram of the pathlength layout of FIG. 7.

FIG. 8 is a schematic diagram of the pathlength layout of FIG. 7, showing an electo-optical pathlength control system in the preferred embodiment. Equivalent elements are labeled by the same numerals in both figures. Without loss of generality, it only shows the pathlength matching between a pair of elemental telescopes 210, 220. For the circle-of-nine array, there are eight such pairs with the pathlength of a selected elemental telescope 220 acting as a reference in each pair. In FIG. 8, the beam-combining module 250 shown in FIG. 7 is illustrated in its functional components. Thus, the turning flat 420 directs each output beam 411 to a compactor 450 to output a scaled-down beam bundle at the pupil 426. Conventional optics 460 residing in the optics box 440 combines the compact beams in the bundle to form an image at an image plane.

A laser metrology system is used to monitor the various pathlengths. To control the first source of pathlength error, the distance between the primary mirror 30 and the secondary mirror 32 is monitored by an interferometer. Retroreflectors (cats-eyes) 470, 472 are respectively attached to the primary mirror 30 and the secondary mirror 32. A laser interferometer 471 is used to monitor the distance 476 between the two retroreflectors 470, 472.

The second source of pathlength error due to the tilting of an elemental telescope may be negligible if the space frame is built sufficiently rigid to hold to acceptable tolerances. However, low-cost autocollimators are readily installed for monitoring this error. Referring to FIG. 7, this is accomplished by using an autocollimator 481 to monitor the distance between a pair of mirrors 480, 482 attached to the primary mirrors 422, 30 of the elemental telescope 210 and the beam-combining module 250 respectively.

To control the third source of pathlength error, the position of the turning flat 411 in the elemental telescope 210 relative to the beam-combining module 250 is monitored. For expediency in the following description, the optical axes of the elemental telescope 210 and the beam-combining module 250 are taken along the z-axis, and the beam path lies in the z-x plane, normal to the y-axis. It is readily seen that displacement of the turning flat 410 along the y-axis hardly affects the pathlength. However, displacement along the z-axis or x-axis is significant. Thus, the position of the turning flat 410 in the z-x plane must be monitored. This is accomplished by a triangulation scheme in which the turning flat 410 is located at a vertex of a triangle. The triangle has its base fixed in the z-x plane. By monitoring the dimensions of the triangle, any displacement of the vertex can be calculated. In general, there will be one triangle for monitoring the turning flat of each elemental telescope.

In a multi-telescope system, a reference frame is set up to form and define the coordinate system within which the position of all the turning flats are measured and monitored. In the preferred embodiment, the reference frame is defined by a pair of retroreflectors 490, 492 fixed at the beam-combining module 250. For simplicity, the line joining the pair of retroreflectors 490, 492 is co-incident with the beam-combining module's optical axis. The line of fixed length becomes the common base of each triangle. A commercially available laser interferometer 493 monitors the length of the base. Sharing the same base for all triangles is advantageous in reducing cost and possibility of errors. The vertex of the triangle for each elemental telescope such as 210 is defined by a retroreflector 494 located at the center of its turning flat 410. The lengths of the sides of the triangle adjacent the vertex 494 are monitored by a pair of laser interferometers 495, 497. Thus any displacement of the turning flat 410 in the z-x plane can be monitored and calculated.

The above description concerns monitoring the pathlength deviations originated from the array of elemental telescopes. Attention is now turned to monitoring the rest of the pathlengths in the beam-combining module 250. Still referring to FIG. 8, the elemental telescope 220 has a turning flat 510 and a corresponding retroreflector 512. The pathlength of concern is from the turning flat 510 to an exit pupil plane 500 just prior to entering the beam compactor 450. This reference path is to be compared with the corresponding pathlength from the turning flat 410 to the pupil plane 500. A laser interferometer 52 is used to monitor the pathlengths. To do so, the two ends of each path must be terminated with a reflector to form a closed loop. The pupil plane 500 is replicated to a convenient location by means of a beam a splitter 522 and terminated with a reflector 526. Thus, the pathlengths being monitored by the interferometer 520 are shown in FIG. 8 by the broken lines from the respective retroreflectors 494, 512 to the reflector 526. An alternative is to locate the beam splitter 522, the reflector 526 and the interferometer 520 between the beam compactor 450 and the lens 460.

Figure 9:
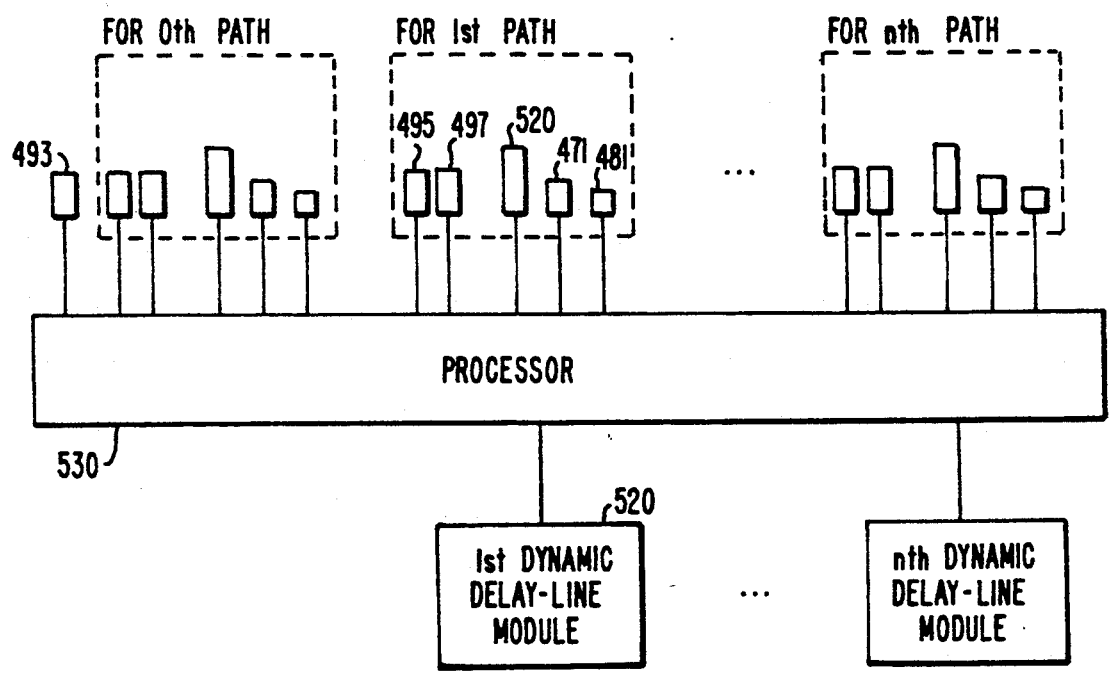
FIG. 9 illustrates schematically the relation between the metrology system and the pathlength control system shown in FIG. 8.

FIG. 9 illustrates schematically the relation between the metrology system and the pathlength control system shown in FIG. 8. The laser metrology system monitors the pathlength deviations through each elemental telescope. A pathlength control system is then used to correct a resultant pathlength deviation for each beam relative to a selected beam among them. This is effected by a dynamic delay-line module responsive to the pathlength deviation. The module 42 is similar to the one previously described in connection with FIG. 1 where the pathlength is adjusted by varying the distance between two mirrors 44, 46. FIG. 9 shows the metrology system of interferometers, for monitoring pathlengths of a 0th, 1st, ..., nth beam corresponding respectively to the elemental telescopes 220, 210, ..., ... shown in FIG. 8. Thus, the 1st beam through the elemental telescope 210 is monitored by the interferometers 493, 495, 497, 520, 471 and 481. Relative to a reference path (e.g., the 0th), the resultant pathlength deviation for each path (e.g., the 1st, ..., nth) is computed by a processor 530. The dynamic delay-line module for each path such as 520 then adjusts the pathlength accordingly.

When the metrology system and the pathlength control system are turned on, the optical path of light from a space object within the multi-telescope array is stabilized against changes from changing thermal and gravity load conditions. The initial paths however may be significantly outside the matching tolerance of the telescope system (1.5 microns for speckle imaging, or 0.02 microns for phased-arrays). Initialization is performed by pointing the array at a bright star. Pairwise matching of the array can be accomplished by blocking the light from all but two of the elemental telescopes going to the CCD detector. The path length control system is then commanded to slowly change the path length in one of the pair until fringes are detected at the CCD. The search rate for finding fringes is dependent on the photon flux from the star. For a bright star, a single 10 msec integration is sufficient for detection of fringes. If fringes are not present, the delay would be changed by approximately 1 microns ($\frac{1}{2}$ of the coherence length.) If the initial path error is 1 mm, initial matching of one pair of telescopes would take approximately 100 sec. This procedure must be repeated by matching one of the nine telescopes with each of the other eight. Variations of this scheme is to match multiple telescopes simultaneously. It can be implemented because the fringe pattern from each pair of telescope can be separated in the Fourier transform of the imaging detector output. A simultaneous matching scheme would matching eight telescopes relative to the ninth in about 100 sec. This initialization procedure is repeated whenever the laser pathlength monitoring system has previously been turned off.

The above description of method and the construction used is merely illustrative thereof and various changes of the details and the methods and construction may be made within the scope of the appended claims.

It is claimed:

1. A telescope, comprising:
   an array of elemental telescopes;
   each elemental telescope receiving light from an object, and outputting an output beam therefrom;
   means for combining the output beams from the array of elemental telescopes to form an image of the object;
   a space frame for supporting the array of elemental telescopes and the beams combining means, such that each elemental telescope has an optical axis aligned along a common axis of the array;
   a pivot on an elevated support for supporting the space frame at substantially its geometric center; and
   drive means for steering the space frame about the pivot.

2. A telescope as in claim 1, further comprising speckle interferometric image processing means for enhancing the image to obtain diffraction-limited resolution.

3. A telescope as in claim 1, wherein the pivot is a gimbal bearing.

4. A telescope as in claim 2, wherein the array of elemental telescopes is in a non-redundant configuration.

* * * * *

UNITED STATES PATENT AND TRADEMARK OFFICE
CERTIFICATE OF CORRECTION

PATENT NO. : 5,108,168
DATED : April 28, 1992
INVENTOR(S) : Norbert, Massie A. et al.

It is certified that error appears in the above-identified patent and that said Letters Patent is hereby corrected as shown below:

On the title page, Item [19] and Item [75]:

"Norbert, Massie A. et al." should be --Norbert A. Massie et al.--.

Below the title, "Norbert, Massie A." should be --Norbert A. Massie-- and "Yale, Oster" should be --Yale Oster--.

Signed and Sealed this

Thirty-first Day of August, 1993

*Attest:*

BRUCE LEHMAN

*Attesting Officer*    *Commissioner of Patents and Trademarks*